(12) United States Patent
Chang et al.

(10) Patent No.: US 7,929,068 B2
(45) Date of Patent: Apr. 19, 2011

(54) PIXEL STRUCTURE

(75) Inventors: Yueh-Ping Chang, Kaohsiung (TW); Chih-Chung Liu, Changhua County (TW); Ming-Tsung Wang, Keelung (TW); Ming-Hsuan Chang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 745 days.

(21) Appl. No.: 12/015,486

(22) Filed: Jan. 16, 2008

(65) Prior Publication Data
US 2008/0303966 A1 Dec. 11, 2008

(30) Foreign Application Priority Data

Jun. 6, 2007 (TW) ................................ 96120320 A (51) Int. Cl.
*G02F 1/1333* (2006.01)
*G02F 1/1343* (2006.01)
(52) U.S. Cl. .......................... 349/38; 349/139
(58) Field of Classification Search .................... 349/38, 349/39, 41, 42, 43, 56, 139, 143, 144, 149, 349/158, 141
See application file for complete search history.

(56) References Cited

U.S. PATENT DOCUMENTS

| 7,095,471 B2 * | 8/2006 | Wu | 349/141 |
| 2004/0001167 A1 * | 1/2004 | Takeuchi et al. | 349/38 |
| 2004/0207792 A1 * | 10/2004 | Wu | 349/141 |
| 2005/0030439 A1 | 2/2005 | Lyu | 349/38 |
| 2006/0158576 A1 | 7/2006 | Kim et al. | 349/38 |
| 2008/0303966 A1 * | 12/2008 | Chang et al. | 349/38 |

* cited by examiner

*Primary Examiner* — Brian M Healy
(74) *Attorney, Agent, or Firm* — Jianq Chyun IP Office (57) ABSTRACT

A pixel structure including a substrate, a scan line, a data line, a first and a second switching device, a first and a second pixel electrode, a first and a second bended pixel electrode, a first and a second connecting conductive layer, and a first and a second common line is provided. The scan line and data line demarcate a first and a second areas on the substrate, and the scan line is located between the two areas. The first and second switching devices are electrically connected to the scan line and the data line and are also electrically connected to the first and second pixel electrodes on the first and second areas respectively. The first and second bended pixel electrodes on the second and first areas are electrically connected to the first and second pixel electrodes through the first and second connecting conductive layers on the scan line respectively.

21 Claims, 7 Drawing Sheets

PIXEL STRUCTURE

CROSS-REFERENCE TO RELATED APPLICATION

This application claims the priority benefit of Taiwan application serial no. 96120320, filed on Jun. 6, 2007. The entirety of the above-mentioned patent application is hereby incorporated by reference herein and made a part of this specification.

BACKGROUND OF THE INVENTION

1. Field of the Invention

The present invention generally relates to a pixel structure, in particular, to a pixel structure adapted for a liquid crystal display (LCD).

2. Description of Related Art

Presently, the design of thin film transistor liquid crystal display (TFT-LCD) is going towards high contrast ratio, no gray scale inversion, high brightness, high color saturation, quick response, and wide viewing angle. The most popular wide viewing angle techniques include twisted nematic (TN) LCD with wide viewing film, in-plane switching (IPS) LCD, fringe field switching (FFS) LCD, and multi-domain vertical alignment (MVA) LCD. Regarding the conventional MVA LCD, wide viewing angle can be achieved because the alignment protrusions or slits formed on a color filter substrate or on a thin film transistor (TFT) array substrate can make the liquid crystal molecules to present different orientations, and accordingly various alignment domains can be obtained. However, color shift may take place when a user watches the same image displayed by the conventional MVA LCD from different viewing angles.

To resolve foregoing problem, a concept of dividing a single pixel structure into two different areas by different voltages is provided, wherein two electrically insulated pixel electrodes are used in the single pixel structure and the two pixel electrode are driven by different voltages. Accordingly, image chromas from different viewing angles are compensated. However, the two electrically insulated pixel electrodes in each pixel structure in an LCD are usually rectangular and arranged regularly, thus, bright (dark) lines or bright (dark) dots may appear when a user looks at an image displayed by the LCD. Thereby, a new problem on bright dots or bright lines is taken place when the color shift problem is resolved.

SUMMARY OF THE INVENTION

Accordingly, the present invention is directed to a pixel structure adapted for a liquid crystal display (LCD) for reducing the appearance of bright (dark) dots or bright (dark) lines in an image displayed by the LCD.

The present invention provides a pixel structure including a substrate, a scan line, a data line, a first switching device, a second switching device, a first pixel electrode, a second pixel electrode, a first bended pixel electrode, a second bended pixel electrode, a first connecting conductive layer, a second connecting conductive layer, a first common line and a second common line. The scan line and the data line disposed on the substrate demarcate a first area and a second area on the substrate, and the scan line is located between the two areas. The first switching device and the second switching device electrically connect to the scan line and the data line respectively. The first pixel electrode which is disposed on the first area and the second pixel electrode which is disposed on the second area electrically connect to the first switching device and the second switching device respectively. The first bended pixel electrode disposed on the second area is electrically connected to the first pixel electrode through the first connecting conductive layer disposed on the scan line. Meanwhile, the second bended pixel electrode disposed on the first area is electrically connected to the second pixel electrode through the second connecting conductive layer disposed on the scan line. The first common line which is disposed under the first pixel electrode and the first pixel electrode form a first storage capacitor, and the second common line which is disposed under the second pixel electrode and the second pixel electrode form a second storage capacitor.

According to an embodiment of the present invention, the input voltages of the first common line and the second common line are not the same such that the coupling voltage differences produced by the first storage capacitor and the second storage capacitor are not the same.

According to an embodiment of the present invention, the input voltages of the first common line and the second common line are reciprocal alternating signals such that the coupling voltage differences produced by the first storage capacitor and the second storage capacitor are not the same.

According to an embodiment of the present invention, the pattern formed by the first pixel electrode and the second bended pixel electrode is rectangular approximately, and the pattern formed by the second pixel electrode and the first bended pixel electrode is also rectangular approximately.

According to an embodiment of the present invention, the first bended pixel electrode includes at least one bending portion and a plurality of extensions extended from the bending portion, and the second bended pixel electrode also includes at least one bending portion and a plurality of extensions extended from the bending portion.

According to an embodiment of the present invention, the first bended pixel electrode may be in the shape of V or W, and the second bended pixel electrode may also be in the shape of V or W.

According to an embodiment of the present invention, the ratio of the whole area of the first pixel electrode and the first bended pixel electrode to the whole area of the second pixel electrode and the second bended pixel electrode may be 1:1.

According to an embodiment of the present invention, the ratio of the whole area of the first pixel electrode and the first bended pixel electrode to the whole area of the second pixel electrode and the second bended pixel electrode may be 2:1.

According to an embodiment of the present invention, the first connecting conductive layer and the first pixel electrode are made of the same layer.

According to an embodiment of the present invention, the pixel structure further includes a plurality of first contact holes located at either sides of the first connecting conductive layer, and the first connecting conductive layer is electrically connected to the first pixel electrode and the first bended pixel electrode respectively through the first contact holes, wherein the first connecting conductive layer and the data line may be made of the same layer.

According to an embodiment of the present invention, the pixel structure further includes a first semiconductor layer disposed between the first connecting conductive layer and the scan line.

According to an embodiment of the present invention, the second connecting conductive layer and the second pixel electrode are made of the same layer.

According to an embodiment of the present invention, when the second connecting conductive layer and the data line are made of the same layer, the pixel structure further includes a plurality of second contact holes located at either sides of the second connecting conductive layer, and the second connecting conductive layer is electrically connected to the second pixel electrode and the second bended pixel electrode respectively through the second contact holes.

According to an embodiment of the present invention, the pixel structure further includes a second semiconductor layer disposed between the second connecting conductive layer and the scan line.

According to an embodiment of the present invention, the first common line surrounds the periphery of the first pixel electrode, and the second common line surrounds the periphery of the second pixel electrode.

According to an embodiment of the present invention, the first switching device and the second switching device may have the same source line.

According to an embodiment of the present invention, there may be a plurality of slits around the first pixel electrode, the second pixel electrode, the first bended pixel electrode, and the second bended pixel electrode. Furthermore, the slits of the first pixel electrode, the second pixel electrode, the first bended pixel electrode, and the second bended pixel electrode are in the shape of featherlike or zigzag such that the response rate of liquid crystal molecules can be increased when this pixel structure is applied to an LCD.

According to the present invention, two bended pixel electrodes are respectively disposed in two areas to form two different storage capacitors. Accordingly, when this pixel structure is applied to an LCD, the distribution of bright and dark regions present a shape of non-rectangular. Hence, the problem of bright (dark) dots or bright (dark) lines in an image displayed by the LCD is resolved. Namely, the display quality of an LCD applying the pixel structure provided by the present invention is improved.

BRIEF DESCRIPTION OF THE DRAWINGS

The accompanying drawings are included to provide a further understanding of the invention and are incorporated in, and constitute a part of this specification. The drawings illustrate embodiments of the invention and together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 1A:
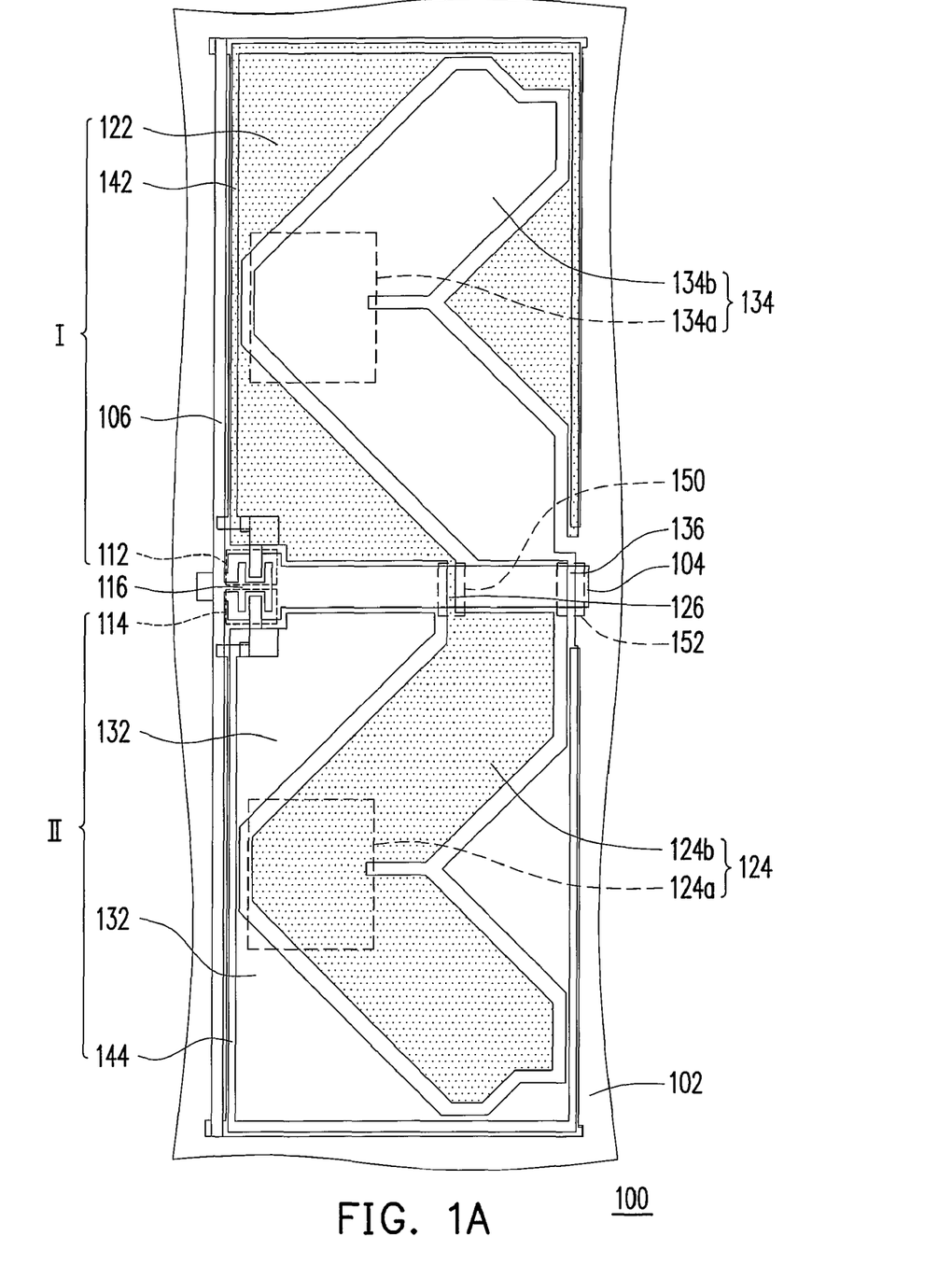
FIG. 1A is a top view of a pixel structure according to a first embodiment of the present invention.

FIG. 1A is a top view of a pixel structure according to a first embodiment of the present invention. Referring to FIG. 1A, the pixel structure 100 includes a substrate 102, a scan line 104, a data line 106, a first switching device 112, a second switching device 114, a first pixel electrode 122, a first bended pixel electrode 124, a first connecting conductive layer 126, a second pixel electrode 132, a second bended pixel electrode 134, a second connecting conductive layer 136, a first common line 142, and a second common line 144.

Figure 1B:
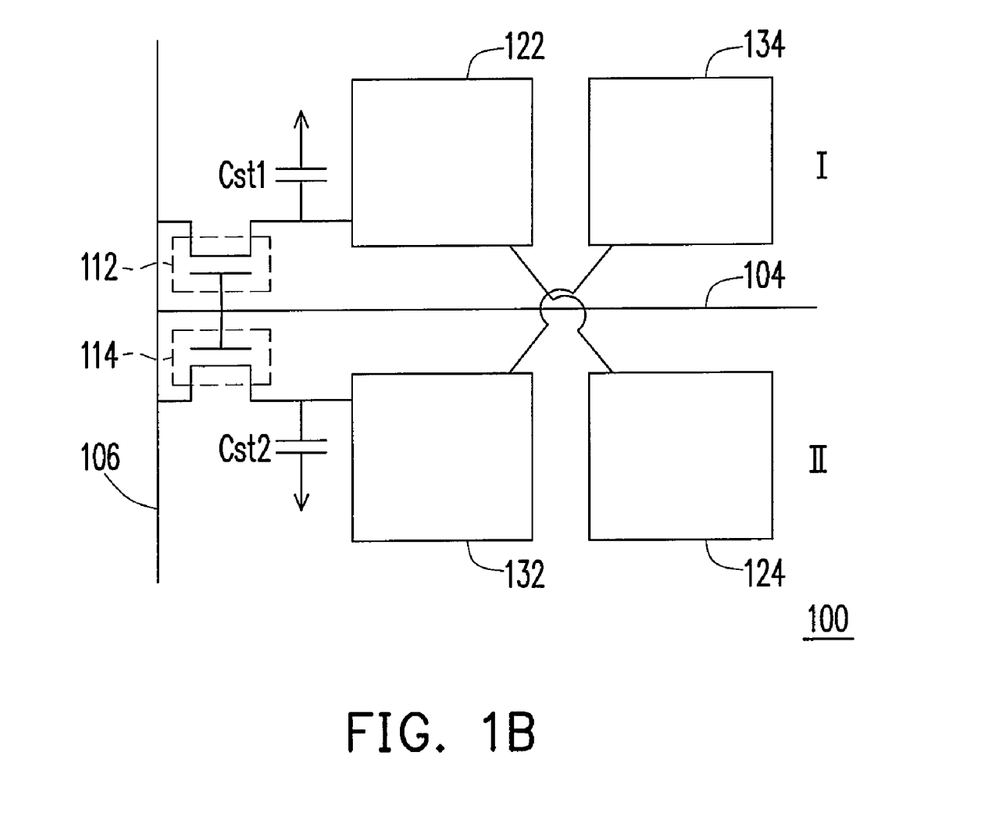
FIG. 1B is an equivalent circuit diagram of a pixel structure according to the first embodiment of the present invention.

FIG. 1B is an equivalent circuit diagram of a pixel structure according to the first embodiment of the present invention. Referring to both FIG. 1A and FIG. 1B, in the pixel structure 100, the scan line 104 and the data line 106 are disposed on the substrate 102, and demarcate a first area I and a second area II on the substrate 102, wherein the scan line 104 is located between the first area I and the second area II. The first switching device 112 is electrically connected to the scan line 104 and the data line 106, and the second switching device 114 is also electrically connected to the scan line 104 and the data line 106. The first pixel electrode 122 is disposed on the first area I and is electrically connected to the first switching device 112. The second pixel electrode 132 is disposed on the second area II and is electrically connected to the second switching device 114. The first bended pixel electrode 124 is disposed on the second area II, and the first connecting conductive layer 126 is disposed on the scan line 104 and is electrically connected to the first bended pixel electrode 124 and the first pixel electrode 122. The second bended pixel electrode 134 is disposed on the first area I, and the second connecting conductive layer 136 is disposed on the scan line 104 and is electrically connected to the second bended pixel electrode 134 and the second pixel electrode 132. The first common line 142 is disposed under the first pixel electrode 122. The first pixel electrode 122 and the first common line 142 form a first storage capacitor Cst1. The second common line 144 is disposed under the second pixel electrode 132, and the second pixel electrode 132 and the second common line 144 form a second storage capacitor Cst2. In the present embodiment, the input voltages of the first common line 142 and the second common line 144 may be different such that the coupling voltage differences produced by the first storage capacitor Cst1 and the second storage capacitor Cst2 are not the same.

In the present embodiment, the first switching device 112 and the second switching device 114 may have the same source line 116, while in other embodiments of the present invention, the first switching device 112 and the second switching device 114 may also have different source lines 116. Generally speaking, the first pixel electrode 122 and the second pixel electrode 132 can get the same voltage when the pixel structure 100 displays an image.

The input voltages of the first common line 142 and the second common line 144 are reciprocal alternating signals, thus, the coupling voltage differences produced by the first storage capacitor Cst1 and the second storage capacitor Cst2 are not the same. However, it is not restricted that the signals of the input voltages of the first common line 142 and the second common line 144 have to be reverse to each other. For example, in another embodiment of the present invention, voltages in different quantity may be input to the first common line 142 and the second common line 144, and the first pixel electrode 122 and the second pixel electrode 132 can have different voltages through the functions of the first storage capacitor Cst1 and the second storage capacitor Cst2. To be specific, when an LCD adopting the pixel structure 100 displays an image, the first pixel electrode 122 and the second pixel electrode 132 have different voltages such that they can compensate the image chromas at different viewing angles.

If those areas having different voltages in a conventional pixel structure are square or rectangular and arranged regularly, bright (dark) dots or bright (dark) lines may appear in an image displayed by an LCD adopting the conventional pixel structure. Thereby, the present invention provides a pixel structure having non-square pixel electrodes in order to resolve foregoing problem.

Referring to FIG. 1A, the first bended pixel electrode 124 and the second bended pixel electrode 134 respectively include at least one bending portion 124a and at least one bending portion 134a, and a plurality of extensions 124b and extensions 134b extended from the bending portions 124a and 134a. To be specific, the first bended pixel electrode 124 and the second bended pixel electrode 134 may be in the shape of V or W. Meanwhile, in the first area I, the first pixel electrode 122 and the second bended pixel electrode 134 form approximately a rectangular pattern, and in the second area II, the second pixel electrode 132 and the first bended pixel electrode 124 also form approximately a rectangular pattern.

Figure 1C:
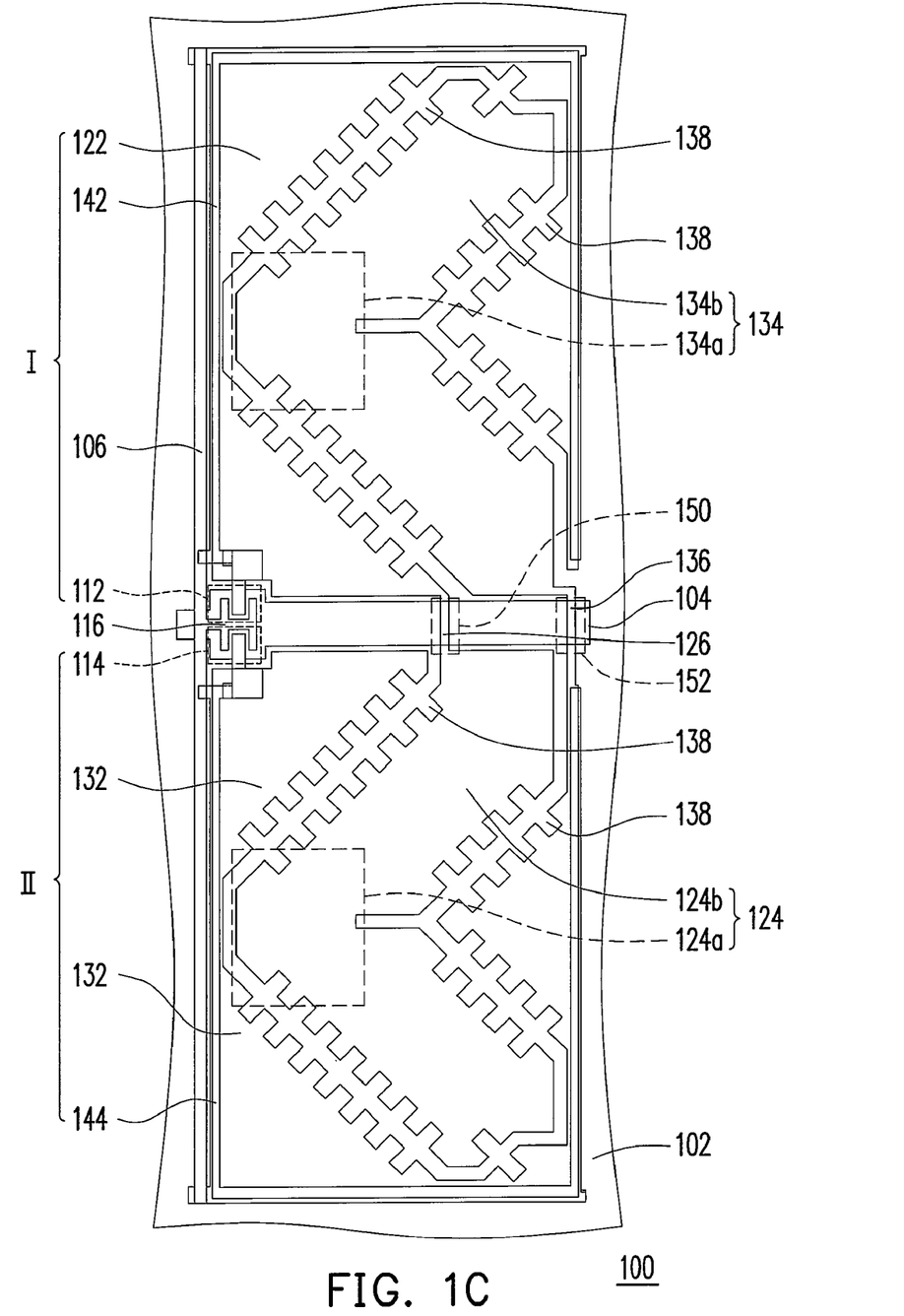
FIG. 1C is a top view of another pixel structure according to the first embodiment of the present invention.

FIG. 1C is a top view of another pixel structure according to the first embodiment of the present invention. Referring to FIG. 1C, in the pixel structure 100, there may be a plurality of slits 138 around the first pixel electrode 122, the second pixel electrode 132, the first bended pixel electrode 124, and the second bended pixel electrode 134. And the slits 138 extend from the peripheries of the first pixel electrode 122, the second pixel electrode 132, the first bended pixel electrode 124, and the second bended pixel electrode 134 toward the insides of the first pixel electrode 122, the second pixel electrode 132, the first bended pixel electrode 124, and the second bended pixel electrode 134. In other words, the slits 138 of the first pixel electrode 122, the second pixel electrode 132, the first bended pixel electrode 124, and the second bended pixel electrode 134 are in the shape of featherlike or zigzag (only zigzag slits 138 are illustrated in FIG. 1C demonstratively) such that the response rate of the liquid crystal molecules can be increased when the pixel structure 100 is applied to an LCD.

The first bended pixel electrode 124 is electrically connected to the first pixel electrode 122 through the first connecting conductive layer 126, and the second bended pixel electrode 134 is electrically connected to the second pixel electrode 132 through the second connecting conductive layer 136. Thus, when the LCD displays an image, the first bended pixel electrode 124 and the first pixel electrode 122 in the pixel structure 100 present the same brightness under the same voltage. Similarly, the second bended pixel electrode 134 and the second pixel electrode 132 also present the same brightness under the same voltage. Accordingly, the brightness presented by the shape of V part of the first area I where the second bended pixel electrode 134 is located is different from the brightness presented by other parts of the first area I where the first pixel electrode 122 is located. Similarly, the same effect is produced in the second area II. Since the pixel structure 100 is divided into the smaller first area I and second area II, and the areas having different brightness in the first area I and the second area II present non-linear and non-grid distribution, bright (dark) dots or bright (dark) lines may not appear in an image displayed by an LCD adopting the pixel structure 100.

In the present embodiment, the first connecting conductive layer 126 and the first pixel electrode 122 are made of the same layer. In other words, the first connecting conductive layer 126 is fabricated together with the first pixel electrode 122, and the material of the first connecting conductive layer 126 may be a conductive material such as indium tin oxide (ITO) or indium zinc oxide (IZO). Meanwhile, as shown in FIG. 1A, the second connecting conductive layer 136 and the second pixel electrode 132 are also made of the same layer, which means the second connecting conductive layer 136 is fabricated together with the second pixel electrode 132. Accordingly, the fabricating process of the pixel structure 100 in the present embodiment is compatible to the conventional fabricating process.

Because the first connecting conductive layer 126 is located on the scan line 104, a parasitic capacitance is produced by the first connecting conductive layer 126 and the scan line 104, and accordingly the signal transmission quality of the scan line 104 is affected, especially in an LCD of large size. Thus, in the present embodiment, the pixel structure 100 may further include a first semiconductor layer 150 disposed between the first connecting conductive layer 126 and the scan line 104 for reducing the parasitic capacitance between the first connecting conductive layer 126 and the scan line 104. For example, the first semiconductor layer 150 may be fabricated together with the semiconductor layers (not shown) in the first switching device 112 and the second switching device 114.

However, in the present invention, a second semiconductor layer 152 may be further disposed between the second connecting conductive layer 136 and the scan line 104 for reducing the parasitic capacitance between the second connecting conductive layer 136 and the scan line 104 so as to further improve the display quality of the LCD adopting the pixel structure 100. To reduce the parasitic capacitance between the first connecting conductive layer 126 and the scan line 104, and the parasitic capacitance between the second connecting conductive layer 136 and the scan line 104, a gate dielectric layer or a passivation layer may also be disposed between the first connecting conductive layer 126 and the scan line 104, or between the second connecting conductive layer 136 and the scan line 104 under fabricating the first switching device 112 and the second switching device 114. On the other hand, the capacitance effect between the first connecting conductive layer 126 and the scan line 104, and the capacitance effect between the second connecting conductive layer 136 and the scan line 104 may also be diminished by reducing the width of the scan line 104.

Second Embodiment

Figure 2:
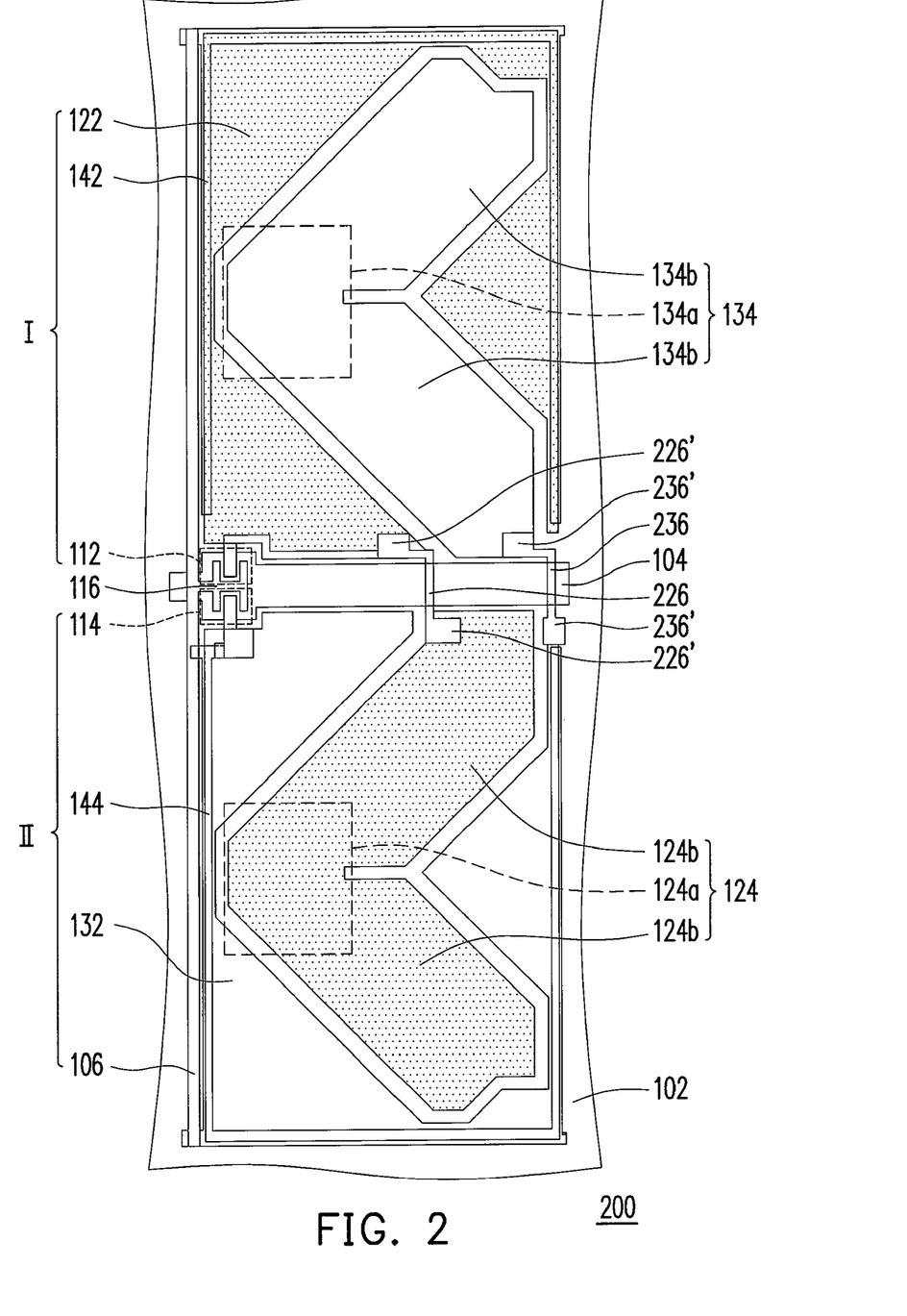
FIG. 2 is a top view of a pixel structure according to a second embodiment of the present invention.

FIG. 2 is a top view of a pixel structure according to a second embodiment of the present invention. Referring to FIG. 2, the pixel structure 200 is similar to the pixel structure 100, wherein identical elements are referred with identical reference numerals, and will not be described herein. The difference between the pixel structure 200 in the present embodiment and the pixel structure 100 in the first embodiment is that the first connecting conductive layer 226 and the data line 106 of the pixel structure 200 in the present embodiment are made of the same layer. In other words, the first connecting conductive layer 226 is fabricated together with the data line 106. Accordingly, a plurality of first contact holes 226' has to be disposed so that the first connecting conductive layer 226 electrically connects to the first pixel electrode 122 and the first bended pixel electrode 124, wherein the first contact holes 226' may be located at either sides of the first connecting conductive layer 226.

In another embodiment of the present invention, the second connecting conductive layer 236 may also be fabricated together with the data line 106, and a plurality of second contact holes 236' are disposed at either sides of the second connecting conductive layer 236 such that the second connecting conductive layer 236 electrically connects to the second pixel electrode 132 and the second bended pixel electrode 134. Additionally, the first connecting conductive layer 226, the second connecting conductive layer 236, and the data line 106 may also be fabricated at the same time. Here all the first contact holes 226' and the second contact holes 236' have to be disposed such that the first connecting conductive layer 226 could electrically connects to the first pixel electrode 122 and the first bended pixel electrode 124, and the second connecting conductive layer 236 could electrically connects to the second pixel electrode 132 and the second bended pixel electrode 134. Actually, in another embodiment of the present invention, a new process step may be added to the conventional manufacturing method for fabricating the first connecting conductive layer 226 and the second connecting conductive layer 236.

Regardless of whether or not the first connecting conductive layer 226 and the second connecting conductive layer 236 are fabricated together with the data line 106, the first semiconductor layer 150 or the second semiconductor layer 152 as shown in FIG. 1 may be disposed between the first connecting conductive layer 226 and the scan line 104 or between the second connecting conductive layer 236 and the scan line 104 in order to reduce the parasitic capacitance between the first connecting conductive layer 226 and the scan line 104 or the parasitic capacitance between the second connecting conductive layer 236 and the scan line 104.

However, according to the present invention, the parasitic capacitance between the first connecting conductive layer 226 and the scan line 104 or between the second connecting conductive layer 236 and the scan line 104 may also be reduced by disposing gate dielectric layers between the first connecting conductive layer 226 and the scan line 104 or the second connecting conductive layer 236 and the scan line 104. Additionally, the parasitic capacitance may also be reduced by reducing the width of the scan line 104. It should be noted that in the present embodiment, the first connecting conductive layer 226 and the second connecting conductive layer 236 are located on the scan line 104, thus, the aperture ratio of the pixel structure 200 will not be affect even if the first connecting conductive layer 226 and the second connecting conductive layer 236 are made of non-transmissive metal.

Third Embodiment

When an LCD displays an image, the image chromas watched from different viewing angles can be compensated by dividing a single pixel structure into two different voltage areas. To further improve the display quality of the LCD, the ratio between the two different voltage areas in the same pixel structure has to be adjusted along with different product design. Accordingly, different pixel structures will be described in the present embodiment, wherein the ratio between the regions of different brightness is changed by adjusting the distribution of pixel electrodes.

Figure 3:
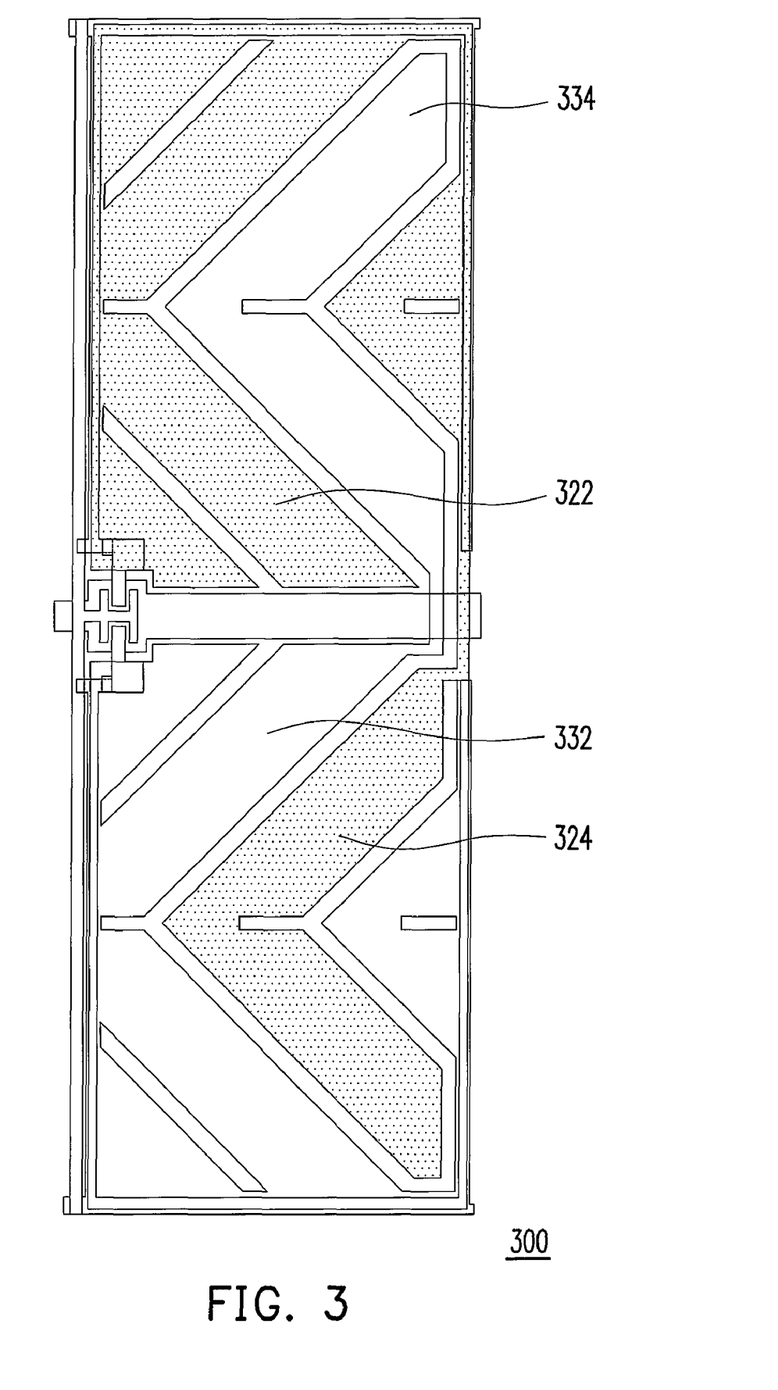
FIG. 3 and FIG. 4 are top views of two pixel structures according to a third embodiment of the present invention.
Figure 4:
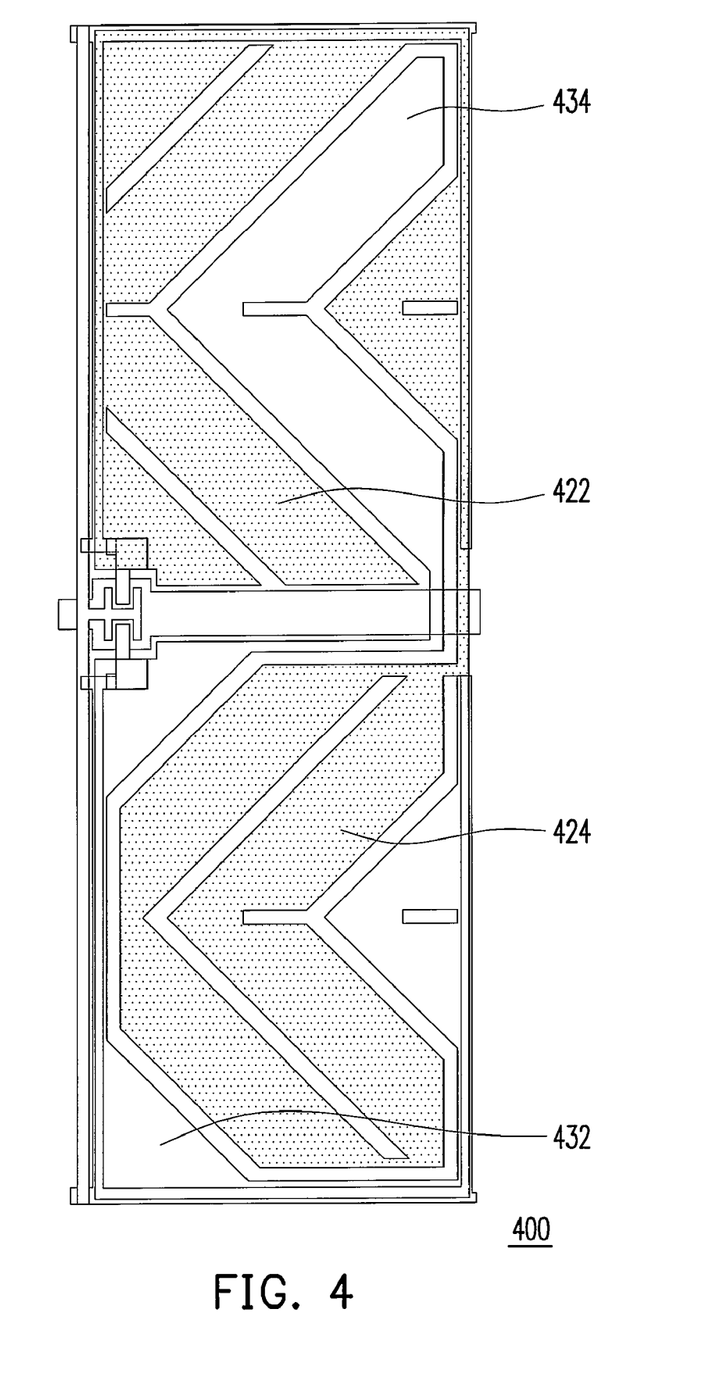

FIG. 3 and FIG. 4 are top views of two pixel structures according to a third embodiment of the present invention. Referring to FIG. 3, the pixel structure 300 may be similar to any one of the two pixel structures described in foregoing two embodiments. However, in the pixel structure 300, the distribution of the first pixel electrode 322, the second pixel electrode 332, the first bended pixel electrode 324, and the second bended pixel electrode 334 is different from that in foregoing embodiments. The ratio of the whole area of the first pixel electrode 322 and the first bended pixel electrode 324 to the whole area of the second pixel electrode 332 and the second bended pixel electrode 334 is 1:1 in FIG. 3. In addition, referring to FIG. 4, in the pixel structure 400, the ratio of the whole area of the first pixel electrode 422 and the first bended pixel electrode 424 to the whole area of the second pixel electrode 432 and the second bended pixel electrode 434 is 2:1.

Actually, the displaying parameter such as color shift and brightness, etc. of an LCD can be modulated by adjusting the areas of different voltages in the pixel structures 300 and 400, thus, when the pixel structure 300 or 400 provided by the present invention is applied to an LCD, the problem of bright (dark) dots or bright (dark) lines can be resolved, and the display quality of the LCD can be further improved through different ways of electrode dispositions.

Fourth Embodiment

Figure 5:
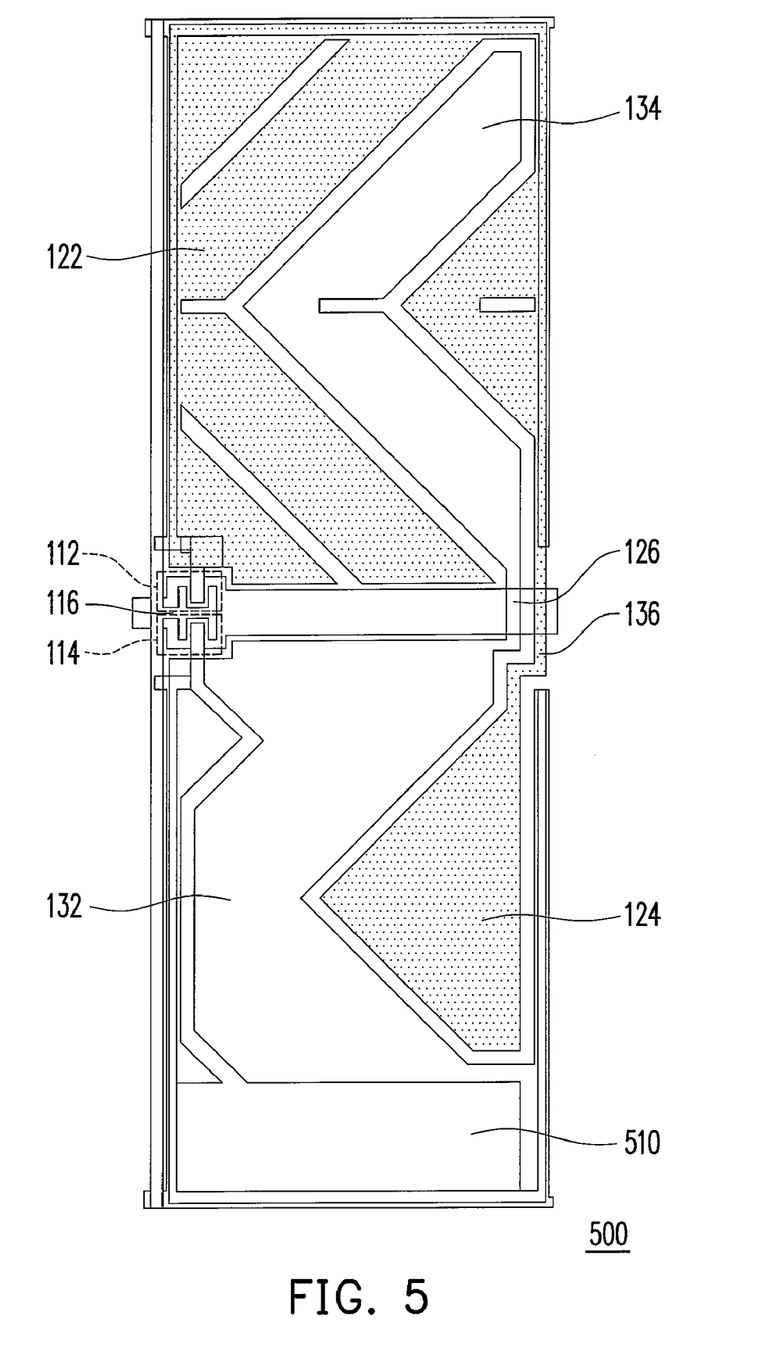
FIG. 5 is a top view of a pixel structure according to a fourth embodiment of the present invention.

According to the present invention, to resolve the problem of bright (dark) dots or bright (dark) lines, the first pixel electrode, the first bended pixel electrode, the second pixel electrode, and the second bended pixel electrode may also be made to have different voltages through the effect of capacitance coupling other than inputting different voltages into the first and the second common line. FIG. 5 is a top view of a pixel structure according to a fourth embodiment of the present invention. Referring to FIG. 5, the components in the pixel structure 500 are similar to those in the pixel structure 100, and the difference between the two pixel structures is that in the pixel structure 500, the second switching device 114 may be connected to a coupling electrode 510, and the second pixel electrode 132 may be disposed on the coupling electrode 510.

When an LCD adopting the pixel structure 500 displays an image, the second pixel electrode 132 and the second bended pixel electrode 134 have a second voltage through the coupling effect thereof with the coupling electrode 510. Thus, the first voltage of the first pixel electrode 122 and the first bended pixel electrode 124 is different from the second voltage of the second pixel electrode 132 and the second bended pixel electrode 134 if the first switching device 112 and the second switching device 114 have the same source line 116. Thus, the pixel structure 500 will not produce bright (dark) dots or bright (dark) lines.

In overview, the pixel structure in the present invention has at least following advantages:
1. In a pixel structure provided by the present invention, a single pixel is demarcated into different smaller areas by a scan line, and a bended pixel electrode is disposed in each of the areas, thus, the problem of bright (dark) dots or bright (dark) lines can be resolved when the pixel structure provided by the present invention is applied to an LCD;
2. In a pixel structure provided by the present invention, different voltages are input to the common lines such that the coupling voltage differences produced by the first storage capacitor and the second storage capacitor are not the same, and accordingly the first pixel electrode and the second pixel electrode present different voltages. Thus, the problem of color shift in an LCD adopting the pixel structure provided by the present invention can be resolved without disposing many active devices, and accordingly the fabricating cost of the LCD can be reduced;
3. In a pixel structure provided by the present invention, pixel electrodes having different voltages can be arranged in different area ratio according to different design requirement. Thus, the brightness and color shift of an LCD adopting the pixel structure provided by the present invention can be modulated and accordingly the display quality of the LCD can be improved;

4. In a pixel structure provided by the present invention, the connecting conductive layers for connecting pixel electrodes in different areas are located on the scan line. Thus, the connecting conductive layers can be fabricated with non-transmissive material, and which will not affect the aperture ratio of the pixel structure provided by the present invention;

5. In a pixel structure provided by the present invention, the first pixel electrode, the second pixel electrode, the first bended pixel electrode, and the second bended pixel electrode have a plurality of slits. Thus, the response rate of the liquid crystal molecules in an LCD adopting the pixel structure provided by the present invention can be increased, and accordingly the display quality of the LCD can be further improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, comprising:
   a substrate;
   a scan line, disposed on the substrate;
   a data line, disposed on the substrate, the scan line and the data line demarcating a first area and a second area on the substrate, wherein the scan line is located between the first area and the second area;
   a first switching device, electrically connected to the scan line and the data line;
   a second switching device, electrically connected to the scan line and the data line;
   a first pixel electrode, disposed on the first area, and electrically connected to the first switching device;
   a second pixel electrode, disposed on the second area, and electrically connected to the second switching device;
   a first bended pixel electrode, disposed on the second area;
   a first connecting conductive layer, disposed on the scan line, and electrically connecting to the first bended pixel electrode and the first pixel electrode;
   a second bended pixel electrode, disposed on the first area;
   a second connecting conductive layer, disposed on the scan line, and electrically connecting to the second bended pixel electrode and the second pixel electrode;
   a first common line, disposed under the first pixel electrode, the first pixel electrode and the first common line forming a first storage capacitor; and
   a second common line, disposed under the second pixel electrode, the second pixel electrode and the second common line forming a second storage capacitor.

2. The pixel structure according to claim 1, wherein the input voltages of the first common line and the second common line are not the same such that the coupling voltage differences produced by the first storage capacitor and the second storage capacitor are not the same.

3. The pixel structure according to claim 2, wherein the input voltages of the first common line and the second common line are reciprocal alternating signals such that the coupling voltage differences produced by the first storage capacitor and the second storage capacitor are not the same.

4. The pixel structure according to claim 1, wherein the pattern formed by the first pixel electrode and the second bended pixel electrode is approximately rectangular.

5. The pixel structure according to claim 1, wherein the pattern formed by the second pixel electrode and the first bended pixel electrode is approximately rectangular.

6. The pixel structure according to claim 1, wherein the first bended pixel electrode and the second bended pixel electrode respectively comprise at least one bending portion and a plurality of extensions extended from the bending portion.

7. The pixel structure according to claim 5, wherein the shape of the first bended pixel electrode comprises a shape of V or W.

8. The pixel structure according to claim 5, wherein the shape of the second bended pixel electrode comprise a shape of V or W.

9. The pixel structure according to claim 1, wherein the ratio of the whole area of the first pixel electrode and the first bended pixel electrode to the whole area of the second pixel electrode and the second bended pixel electrode is 1:1.

10. The pixel structure according to claim 1, wherein the ratio of the whole area of the first pixel electrode and the first bended pixel electrode to the whole area of the second pixel electrode and the second bended pixel electrode is 2:1.

11. The pixel structure according to claim 1, wherein the first connecting conductive layer and the first pixel electrode are made of the same layer.

12. The pixel structure according to claim 1, further comprising a plurality of first contact holes located at either sides of the first connecting conductive layer, wherein the first connecting conductive layer is electrically connected to the first pixel electrode and the first bended pixel electrode respectively through the first contact holes, and the first connecting conductive layer and the data line are made of the same layer.

13. The pixel structure according to claim 1, further comprising a first semiconductor layer disposed between the first connecting conductive layer and the scan line.

14. The pixel structure according to claim 1, wherein the second connecting conductive layer and the second pixel electrode are made of the same layer.

15. The pixel structure according to claim 1, further comprising a plurality of second contact holes located at either sides of the second connecting conductive layer, wherein the second connecting conductive layer is electrically connected to the second pixel electrode and the second bended pixel electrode respectively through the second contact holes, and the second connecting conductive layer and the data line are made of the same layer.

16. The pixel structure according to claim 1, further comprising a second semiconductor layer disposed between the second connecting conductive layer and the scan line.

17. The pixel structure according to claim 1, wherein the first common line surrounds the periphery of the first pixel electrode.

18. The pixel structure according to claim 1, wherein the second common line surrounds the periphery of the second pixel electrode.

19. The pixel structure according to claim 1, wherein the first switching device and the second switching device have a same source line.

20. The pixel structure according to claim 1, wherein the first pixel electrode, the second pixel electrode, the first bended pixel electrode, and the second bended pixel electrode have a plurality of slits.

21. The pixel structure according to claim 20, wherein the slits are in the shape featherlike or zigzag.

* * * * *